(12) United States Patent
Harner et al.

(10) Patent No.: US 11,097,831 B2
(45) Date of Patent: Aug. 24, 2021

(54) GAS TURBINE ENGINE NOSE CONE ASSEMBLY

(71) Applicant: United Technologies Corporation, Farmington, CT (US)

(72) Inventors: John Harner, Vernon, CT (US); James J. McPhail, New London, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 102 days.

(21) Appl. No.: 16/504,043

(22) Filed: Jul. 5, 2019

(65) Prior Publication Data

US 2020/0010172 A1 Jan. 9, 2020

Related U.S. Application Data

(60) Provisional application No. 62/694,774, filed on Jul. 6, 2018.

(51) Int. Cl.
| | | |
|---|---|---|
| *B64C 11/14* | (2006.01) | |
| *F02C 7/04* | (2006.01) | |
| *F04D 29/52* | (2006.01) | |
| *F01D 5/06* | (2006.01) | |
| *F04D 29/32* | (2006.01) | |

(Continued)

(52) U.S. Cl.
CPC ............. *B64C 11/14* (2013.01); *F01D 5/066* (2013.01); *F02C 7/04* (2013.01); *F04D 29/329* (2013.01); *F04D 29/522* (2013.01); *F01D 9/04* (2013.01); *F04D 29/325* (2013.01); *F04D 29/541* (2013.01); *F05D 2220/36* (2013.01); *F05D 2250/232* (2013.01)

(58) Field of Classification Search
CPC ... B64C 11/14; F02C 7/04; F01D 5/02; F01D 5/021; F01D 5/066; F01D 9/00; F01D 9/04; F04D 29/325; F04D 29/329; F04D 29/541; F05D 2220/36; F05D 2250/24; F05D 2250/241; F05D 2250/232
USPC ...... 415/218.1, 219.1; 416/94, 245 R, 245 A
See application file for complete search history.

(56) References Cited

U.S. PATENT DOCUMENTS

| | | | |
|---|---|---|---|
| 3,356,549 A | | 12/1967 | King |
| 3,799,693 A | * | 3/1974 | Hull .......................... F02C 7/04 |
| | | | 415/218.1 |

(Continued)

FOREIGN PATENT DOCUMENTS

GB     2364748 A    8/2000

OTHER PUBLICATIONS

EP search report for EP19184939.7 dated Dec. 5, 2019.

*Primary Examiner* — Christopher Verdier
(74) *Attorney, Agent, or Firm* — Getz Balich LLC

(57) ABSTRACT

A nosecone assembly having an axially extending centerline is provided. The assembly includes a nosecone body and at least one access panel. The nosecone body has at least one wall that defines an interior cavity. The wall has an interior surface contiguous with the interior cavity, and at least one window aperture extending through the wall. The access panel has first and second face surfaces. The access panel is attached to the wall interior surface within an attachment region that includes first and second attachment region portions partially contiguous with one another. The first and second attachment region portions define an interior unattached region, and the interior unattached region is aligned with the window aperture.

18 Claims, 7 Drawing Sheets

(51) Int. Cl.
*F01D 9/04* (2006.01)
*F04D 29/54* (2006.01)

(56) References Cited

U.S. PATENT DOCUMENTS

| | | |
|---|---|---|
| 5,573,378 A | 11/1996 | Barcza |
| 6,561,763 B2 | 5/2003 | Breakwell |
| 9,664,201 B2 * | 5/2017 | Dudon .................... C23C 24/04 |
| 10,352,236 B2 * | 7/2019 | Kling ...................... B29C 45/00 |
| 2010/0322782 A1 | 12/2010 | Welch |
| 2016/0160681 A1 | 6/2016 | Roach et al. |
| 2016/0230580 A1 * | 8/2016 | Robertson ............. F01D 11/005 |

* cited by examiner

GAS TURBINE ENGINE NOSE CONE ASSEMBLY

This application claims priority to U.S. Patent Appln. No. 62/694,774 filed Jul. 6, 2018, which is hereby incorporated by reference.

BACKGROUND

The present disclosure relates generally to gas turbine engines, and in particular to nosecones for gas turbine engines.

A gas turbine engine is a type of power plant commonly used for generating thrust for aircrafts, power for land or sea based operations, or other applications. A typical gas turbine engine includes an inlet section for drawing in a large mass of air, a compressor section for receiving and compressing the large mass of air to provide high-pressure air, a combustion section for mixing and combusting air and fuel, and a turbine section for receiving combustion gases and causing turbine blades to rotate to generate the aforementioned thrust or power.

The inlet section of the gas turbine engine may employ a nosecone assembly attached to a support structure, such as a support structure attached to a rotor or an inlet guide vane, etc. The nosecone assembly may be constructed of a plurality of pieces configured to promote aerodynamic flow of air into the gas turbine engine. The nosecone assembly often includes a nosecone body and a support structure configured to attach the body to a structural element of the gas turbine engine; e.g., a fan rotor stage. The ability of the nosecone to promote aerodynamic air flow into the gas turbine engine is an important aspect. It is also important that the nosecone be configured to avoid receiving water or debris, and be configured to facilitate assembly and maintenance.

SUMMARY

According to a first aspect of the present disclosure, a nosecone assembly having an axially extending centerline is provided. The assembly includes a nosecone body and at least one access panel. The nosecone body has at least one wall extending between a forward end and an aft end. The wall at least in part defines an interior cavity of the nosecone body. The wall has an interior surface contiguous with the interior cavity, and at least one window aperture extending through the wall. The at least one access panel has a first face surface and an opposite second face surface, a first end, a second end, a first lateral edge, and a second lateral edge. The first lateral edge extends between the first end and the second end, and the second lateral edge extends between the first end and the second end. The at least one access panel is attached to the wall interior surface within an attachment region that includes a first attachment region portion partially contiguous with a second attachment region portion. The first attachment region portion and the second attachment region portion collectively define an interior unattached region disposed between at least a length of the first attachment region portion and at least a length of the second attachment region portion. The interior unattached region is aligned with the window aperture.

According to another aspect of the present disclosure, a nosecone assembly having an axially extending centerline is provided. The assembly includes a nosecone body and at least one access panel. The nosecone body has at least one wall extending between a forward end and an aft end. The wall at least in part defines an interior cavity of the nosecone body. The wall has an interior surface contiguous with the interior cavity, and at least one window aperture extending through the wall. The at least one access panel has a first face surface and an opposite second face surface. The at least one access panel is attached to the wall interior surface within an attachment region that includes a first attachment region portion partially contiguous with a second attachment region portion. The first attachment region portion and the second attachment region portion collectively define an interior unattached region. The interior unattached region is aligned with the window aperture.

According to another aspect of the present disclosure, a gas turbine engine is provided that includes a fan section and a nosecone assembly connected to the fan section. The nosecone assembly has an axially extending centerline, and includes a nosecone body and at least one access panel. The nosecone body has at least one wall extending between a forward end and an aft end. The wall at least in part defines an interior cavity of the nosecone body. The wall has an interior surface contiguous with the interior cavity, and at least one window aperture extending through the wall. The at least one access panel has a first face surface and an opposite second face surface, a first end, a second end, a first lateral edge, and a second lateral edge. The first lateral edge extends between the first end and the second end, and the second lateral edge extends between the first end and the second end. The at least one access panel is attached to the wall interior surface within an attachment region that includes a first attachment region portion partially contiguous with a second attachment region portion. The first attachment region portion and the second attachment region portion collectively define an interior unattached region disposed between at least a length of the first attachment region portion and at least a length of the second attachment region portion. The interior unattached region is aligned with the window aperture.

In any of the aspects or embodiments described above and herein, the first lateral edge may extend a first distance between the first end and the second end, and the first attachment region portion may extend a second distance along the first lateral edge from the second end towards the first end, where the second distance is less than the first distance.

In any of the aspects or embodiments described above and herein, the second lateral edge may extend a third distance between the first end and the second end, and the second attachment region portion may extend a fourth distance along the second lateral edge from the second end towards the first end, where the fourth distance is less than the third distance.

In any of the aspects or embodiments described above and herein, the attachment region may be "U" shaped, with the interior unattached region disposed within the "U" shape.

In any of the aspects or embodiments described above and herein, the attachment region may be "V" shaped, with the interior unattached region disposed within the "V" shape.

In any of the aspects or embodiments described above and herein, the at least one access panel may comprise an elastomeric material.

In any of the aspects or embodiments described above and herein, the at least one access panel may be disposable in a normal state wherein at least a portion of the access panel is biased against the wall interior surface, and is configured to elastically return to the normal state.

In any of the aspects or embodiments described above and herein, the first lateral edge and the second lateral edge may converge toward one another in a direction from the first end edge towards the second end.

In any of the aspects or embodiments described above and herein, the first lateral edge and the second lateral edge may collectively form a "V" shape in proximity to the second end.

In any of the aspects or embodiments described above and herein, the first end may extend a first distance between the first lateral edge and the second lateral edge, and the second end may extend a second distance between the first lateral edge and the second lateral edge, and the first distance is greater than the second distance.

In any of the aspects or embodiments described above and herein, the at least one access panel may include a protrusion shaped to mate with the window aperture.

In any of the aspects or embodiments described above and herein, the at least one access panel may include a protective substrate attached to the first face surface, and positioned to align with window.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, material, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
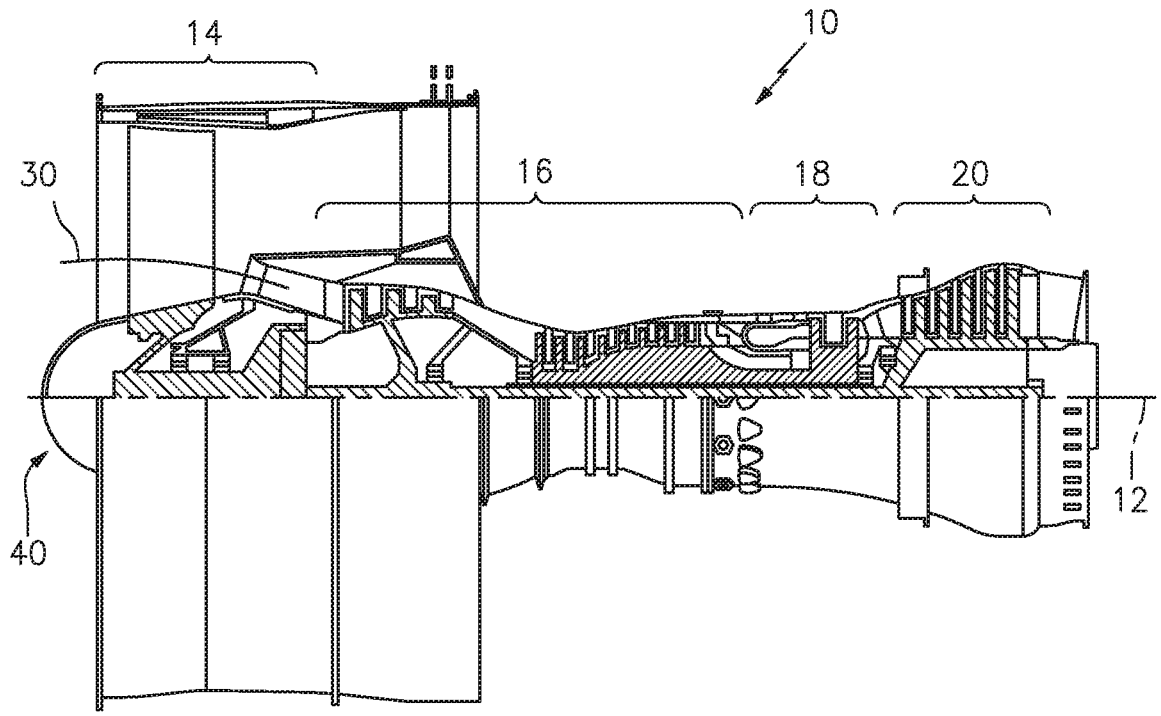
FIG. 1 is a diagrammatic partially sectioned view of a gas turbine engine.

FIG. 1 is an axial sectional diagrammatic view of a gas turbine engine 10 including a longitudinal engine axis 12, a fan section 14, a compressor section 16, a combustor section 18, and a turbine section 20. The compressor section 16 includes a low pressure compressor and a high pressure compressor. The turbine section 20 typically includes a low pressure turbine and a high pressure turbine. A low speed spool typically connects the fan section 14 and the low pressure compressor to the low pressure turbine. In some embodiments, the low speed spool may be connected to the fan section through a speed change mechanism (e.g., a geared architecture that drives the fan section 14 at a lower rotational speed than the low speed spool). A high speed spool connects the high pressure compressor to the high pressure turbine. The combustor section 18 is disposed between the high pressure compressor and the high pressure turbine. The low speed spool and the high speed spools are typically concentric and rotate about the engine longitudinal axis.

During operation of engine 10, a gas stream 30 (initially comprised of air) is drawn into the front of engine 10 by rotation of fan blades disposed within the fan section 14. The fan section 14 directs a portion of the gas stream 30 into the compressor section 16. The gas stream 30 is successively compressed (e.g., elevated in temperature and pressure) through stages of the compressor section 16 and directed into the combustor section 18. In combustor section 18, the now-compressed gas stream 30 is mixed with fuel and ignited. The gas and fuel mixture ignited in the combustor section 18 is directed into the turbine section 20 in which the gas stream (now including air, combustion products, etc.) is successively expanded. The high pressure turbine extracts energy from the gas stream to power the high pressure compressor via the high speed spool. The low pressure turbine extracts energy from the gas stream to power the fan section 14 and the compressor section 16 via the low speed spool. The gas stream 30 subsequently exits the engine 10, producing useful thrust for engine 10.

The gas turbine engine 10 described above and shown in FIG. 1 is a non-limiting example of a gas turbine engine that may include aspects of the present disclosure. The present disclosure is not limited to any particular gas turbine engine embodiment; e.g., a turbofan gas turbine engine, a ramjet gas turbine engine, a gas turbine engine with a geared architecture for driving the fan, etc.

Figure 2:
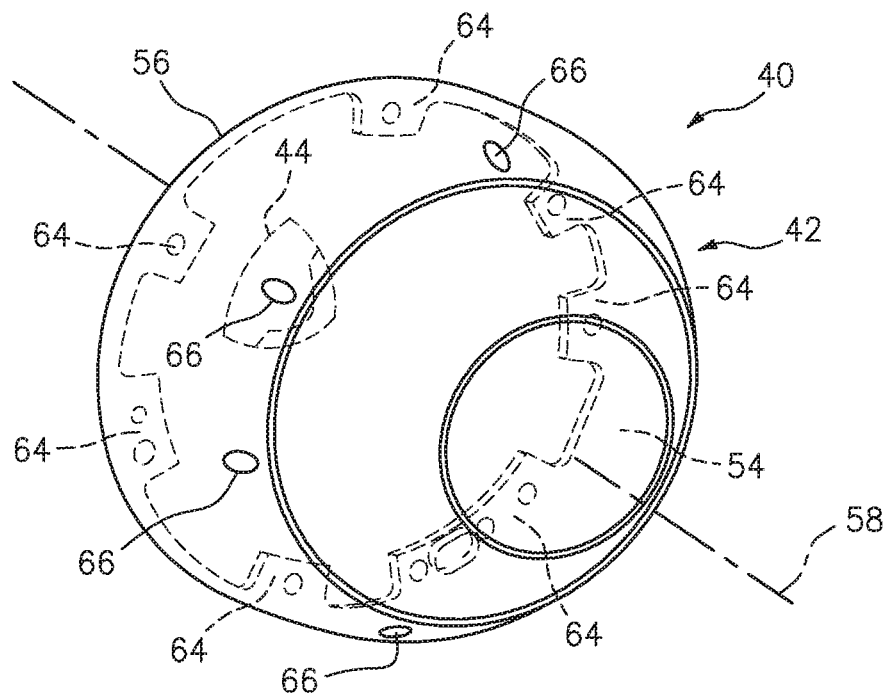
FIG. 2 is a diagrammatic perspective view of a nosecone assembly embodiment.
Figure 3:
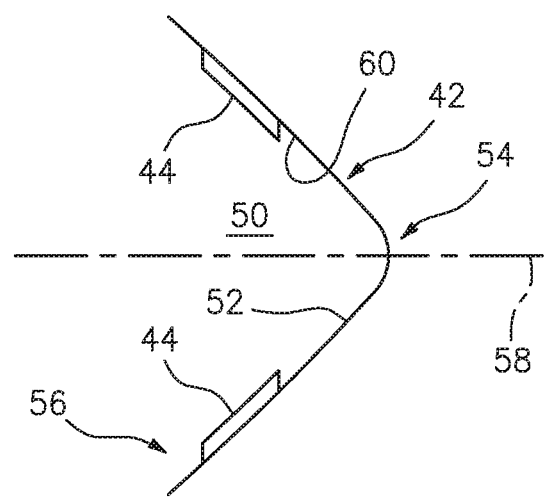
FIG. 3 is a diagrammatic side view of a nosecone assembly embodiment.
Figure 4:
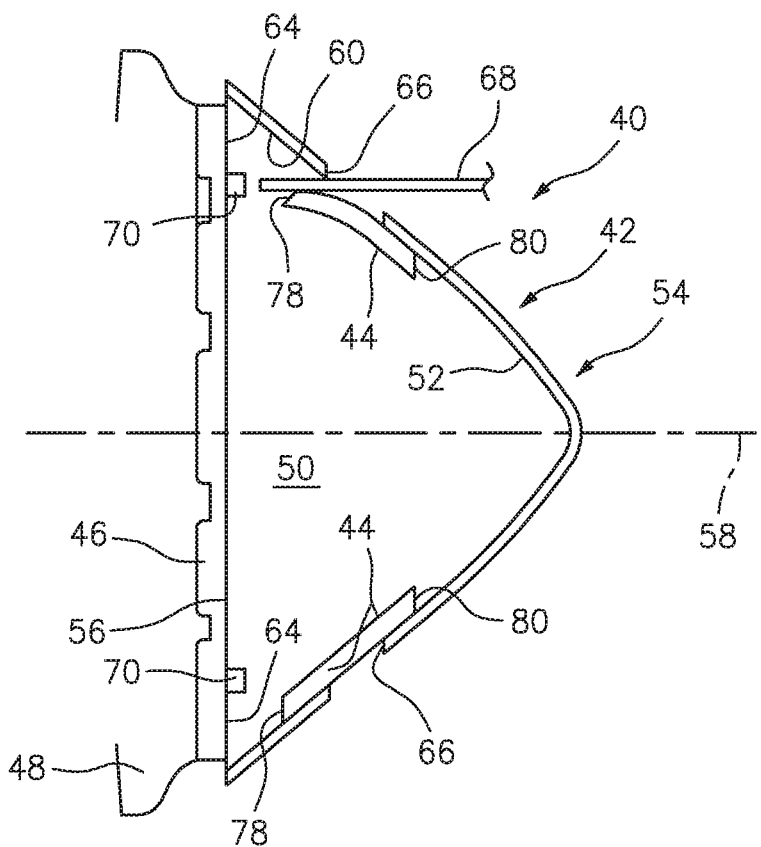
FIG. 4 is a diagrammatic side view of a nosecone assembly embodiment.

Referring to FIGS. 2-4, the gas turbine engine also includes a nosecone assembly 40 having a nosecone body 42, at least one access panel 44, and in some embodiments may include an attachment structure 46. The nosecone assembly 40 may be configured to be non-rotational or rotational, and is configured for attachment to a structural element 48 of the gas turbine engine 10. A non-rotational nosecone assembly 40 may, for example, be mounted relative to a non-rotational engine structural element 48 such as a guide vane assembly of the fan section of the gas turbine engine 10. Conversely, a rotational nosecone assembly 40 may be mounted relative to a rotating engine structural element such as a fan rotor stage of the gas turbine engine 10. In either configuration, the attachment structure 46 is utilized to mount the nosecone body 42. The nosecone body 42 may be attached to the attachment structure 46 via mounting hardware (e.g., flanges, fasteners, etc.) disposed at a plurality of positions around the circumference of the nosecone assembly 40. The attachment structure 46 may be attached to the engine structural element 48 via mounting hardware (e.g., brackets, fasteners, etc.) disposed at a plurality of positions around the circumference of the nosecone assembly 40.

The nosecone body 42 is a hollow structure having an interior cavity 50 that is defined at least in part by a wall 52. The nosecone body 42 has a forward end 54 (e.g., disposed at a point or peak of the nose cone body 42) and an aft end 56. As used herein, the terms "forward" and "aft" are defined as follows: forward is defined as being upstream of aft; e.g., air enters the forward located fan section of a gas turbine engine and exits the aft located nozzle of the engine. An axially extending centerline 58 extends through the forward end 54 peak and the aft end 56 of the nosecone body 42. The forward end 54 of the nosecone body 42 is closed. The wall 52 has an interior surface 60 and an exterior surface 62, and may be positioned so as to be radially symmetrical relative to the axially extending centerline 58. The present disclosure is not limited to any particular nosecone body 42 shape; e.g., conical, parti-conical, elliptical, spherical, etc. The interior surface 60 is contiguous with the interior cavity 50. The aft end 56 of the nosecone body 42 may be open (e.g., an interior cavity 50 that is not completely enclosed), or may be at least partially open. The aft edge of the wall 52 extends circumferentially to define the aft end 56 of the nosecone body 42. In some embodiments, the nosecone body 42 may include a plurality of flanges 64, each extending radially inwardly towards the axially extending centerline 58. The flanges 64 may be configured (e.g., include fastener apertures) to facilitate attachment of the nosecone body 42 to the engine structural element 48.

The nosecone body 42 includes a plurality of apertures (i.e., "windows 66") extending through the wall 52. The windows 66 are spaced apart from one another around the circumference. The windows 66 are configured to permit a fastener tool 68 to extend through the window 66 to permit access to fasteners 70 attaching the nosecone body 42 to the engine structural element. Typically, a tool 68 configured to actuate a fastener 70 attaching the nosecone body 42 to the engine structural element (i.e., to install the fastener 70 or to remove the fastener 70) will extend through the window 66 in a direction that extends substantially parallel to the axially extending centerline 58 of the nosecone body 42. The present disclosure is not limited to any particular window 66 geometric configuration or any tool 68 for actuating the aforesaid fasteners 70.

Referring to FIGS. 5-10, a present disclosure access panel 44 includes a first face surface 72 and an opposite second face surface 74, and a thickness 76 that extends normal between the two face surfaces 72, 74. The access panel 44 may include a first end 78, a second end 80, a first lateral edge 82, and a second lateral edge 84. The first lateral edge 82 extends between the first end 78 and the second end 80, and the second lateral edge 84 extends between the first end 78 and the second end 80. A perimeter of the first and second face surfaces 72, 74 is defined by the first and second ends 78, 80 and the first and second lateral edges 82, 84.

The present disclosure access panels 44 may assume a variety of different geometric configurations. In some embodiments (e.g., see FIGS. 5, 6, and 8), the first and second lateral edges 82, 84 are disposed to converge toward one another in a direction 86 from the first end 78 towards the second end 80. In these embodiments, the distance 88 between the first and second lateral edges 82, 84 at the first end 78 is, therefore, greater than the distance 90 between the first and second lateral edges 82, 84 at the second end 80. In the access panel 44 embodiments shown in FIGS. 5 and 6, the distance 90 between the first and second lateral edges 82, 84 at the second end 80 is minimal; e.g., the first and second lateral edges 82, 84 do not intersect with one another but collectively form a "V" shape in proximity to the second end 80. In some embodiments, the second end 80 may be described as blending the first and second lateral edges 82, 84. As will be explained below, the present disclosure access panels 44 are not limited to geometries wherein the first lateral edge 82 and the second lateral edge 84 collectively form a "V", or the second end 80 blends the first and second lateral edges 82, 84. For example in the access panel 44 embodiment shown in FIG. 8, the distance 90 between the first and second lateral edges 82, 84 at the second end 80 is approximately half the distance 88 between the first and second lateral edges 82, 84 at the first end 78.

Figure 5:
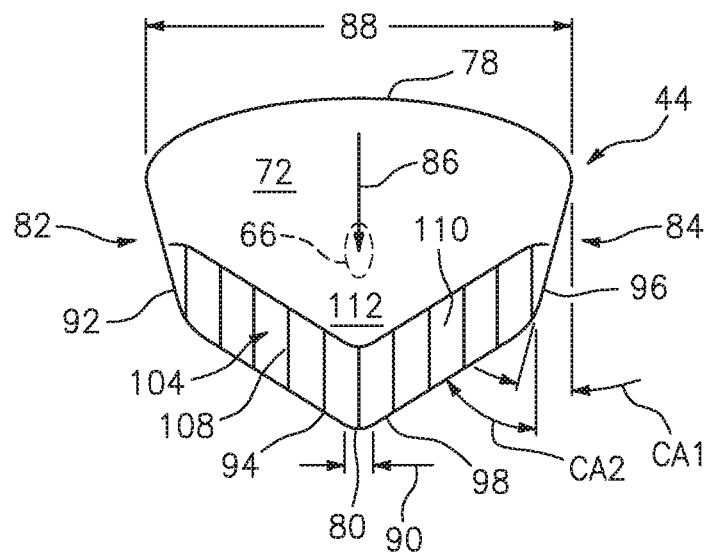
FIG. 5 is a diagrammatic planar view of an access panel embodiment.
Figure 6:
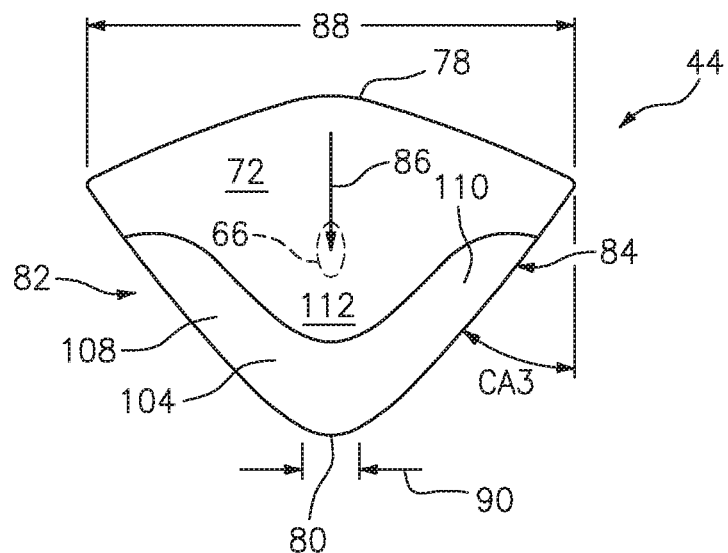
FIG. 6 is a diagrammatic planar view of an access panel embodiment.
Figure 7:
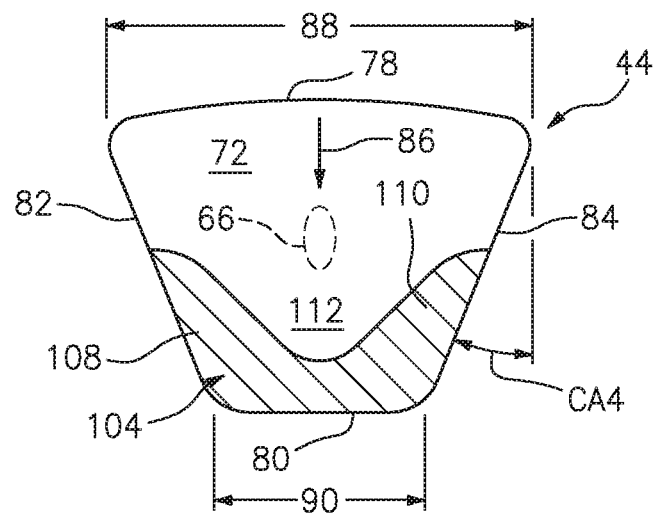
FIG. 7 is a diagrammatic planar view of an access panel embodiment.
Figure 8:
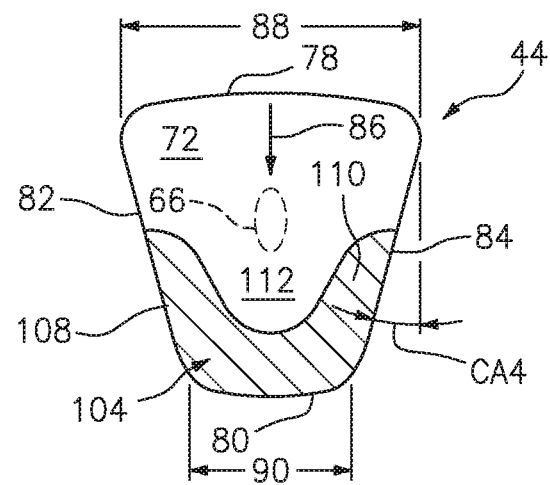
FIG. 8 is a diagrammatic planar view of an access panel embodiment.
Figure 9:
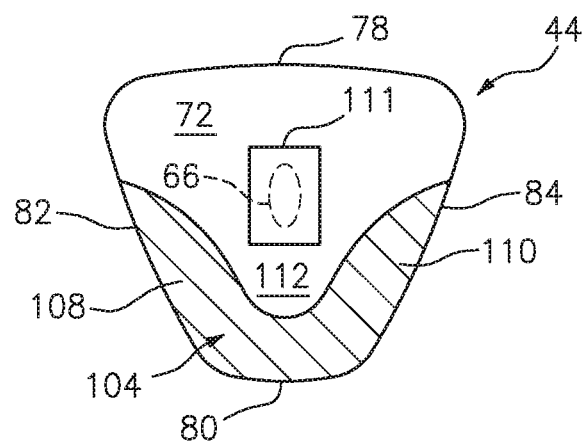
FIG. 9 is a diagrammatic planar view of an access panel embodiment.

In the access panel 44 embodiment shown in FIG. 5, the first lateral edge 82 includes a first portion 92 and a second portion 94, and the second lateral edge 84 includes a first portion 96 and a second portion 98. The first portions 92, 96 converge toward one another at a first angle "CA1" and the second portions 94, 98 converge toward one another at a second angle "CA2". As can be seen in FIG. 5, the second portions 94, 98 converge toward one another more rapidly than do the first portions 92, 96; i.e., CA2>CA1. In the access panel 44 embodiment shown in FIG. 6, the first lateral edge 82 and the second lateral edge 84 converge toward one another at a first angle "CA3". In the access panel 44 embodiment shown in FIGS. 7 and 8, the first lateral edge 82 and the second lateral edge 84 converge toward one another at a first angle "CA4".

Figure 10:
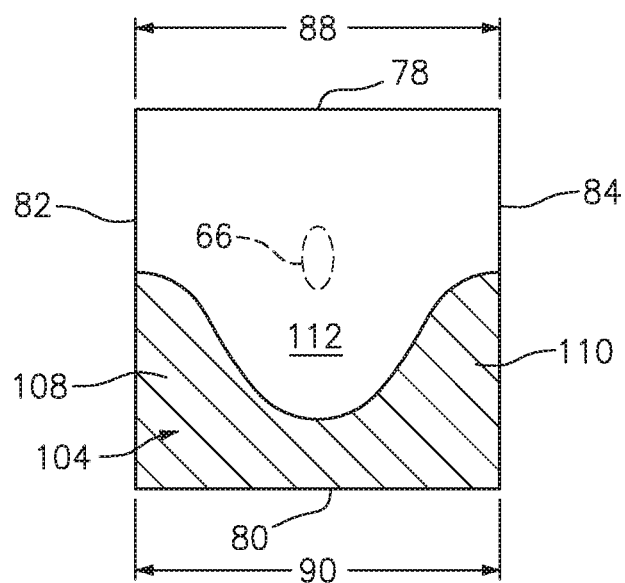
FIG. 10 is a diagrammatic planar view of an access panel embodiment.

In some embodiments, the lateral edges 82, 84 do not converge towards one another; e.g., the access panel 44 may have a generally rectangular shape configuration (e.g., a square configuration as shown in FIG. 10) or a hexagonal shape configuration.

A first end 78, second end 80, first lateral edge 82, or second lateral edge 84 of an access panel 44 embodiment (or any combination thereof) may extend along a straight line or along an arcuate line. In the diagrammatic illustration shown in FIG. 5 for example, the first portions 92, 96 and the second portions 94, 98 are each shown extending substantially along straight lines. The access panel 44 embodiment shown in FIG. 6 includes a first lateral edge 82 and a second lateral edge 84 that extend along arcuate lines. The access panel 44 embodiments shown in FIGS. 7 and 8 include a first end 78 that extends along an arcuate line. The access panel 44 embodiment shown in FIG. 8 includes an arcuate-shaped second end 80. The access panel 44 embodiment shown in FIG. 9 includes an arcuate-shaped first and second lateral edges 82, 84. In those embodiments wherein a lateral edge 82, 84 extends along an arcuate line, a dissecting line representative of the average position of the aforesaid line may be may be used to establish the respective angle (e.g., CA1, CA3, or CA4).

The present disclosure access panels 44 comprise an elastomeric material that may be elastically deflected from a first position to a second position, and will elastically return to the first position from the second position. Non-limiting examples of acceptable elastomeric materials include silicones, urethanes, nitrile rubbers, diene and butadiene rubbers, fluorosilicones, fluorocarbons, chloroprenes and isoprenes.

Figure 12:
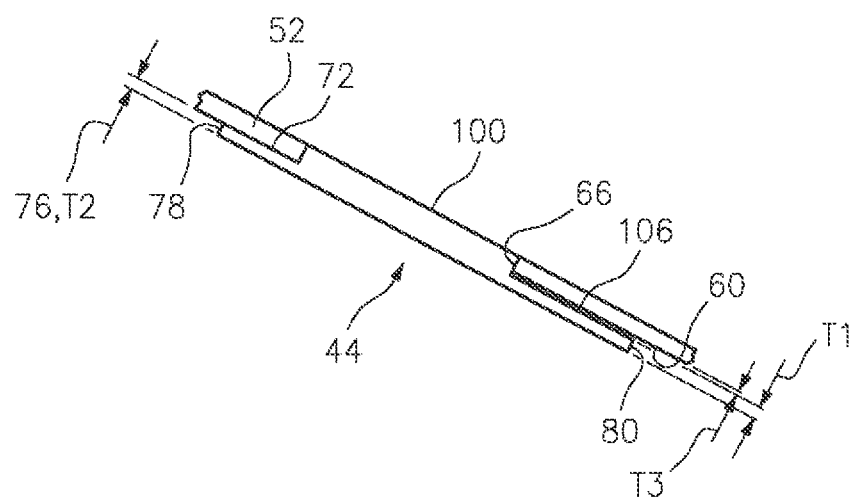
FIG. 12 is a sectioned partial view of a nosecone body and an access panel embodiment.

Referring to FIG. 12, in some embodiments the access panel 44 may include a protrusion 100 shaped to mate with the window 66 that extends outwardly from the first face surface 72 of the access panel 44. As will be described below, when the access panel 44 is mounted onto the interior surface 60 of the nosecone body wall 52, the protrusion 100 is received within the window 66.

In some embodiments, a protective substrate 111 (see FIG. 9) may be fixed to the first face surface 72 of the access panel 44 positioned to align with window 66. The protective substrate 111 (e.g., a metallic substrate, etc.) may be configured to protect the access panel 44 from damage (e.g., from a tool, or foreign object impact) or wear (e.g., particle erosion) that may occur during use. As an example, the protective substrate may be comprised of a material that has greater wear resistant properties than the material of the access panel 44.

Each access panel 44 may be attached to the interior surface 60 of the nosecone body wall 52 by an adhesive 106. Non-limiting examples of acceptable adhesives include acrylates, silicones, epoxies, phenolics, imides and urethanes. The present disclosure is not limited to using an adhesive to attach an access panel 44 to the nosecone body wall; e.g., an access panel may be attached by other means such as fasteners, mechanical structure, bonding agents, etc.

Referring to FIGS. 5-10, the access panel 44 includes an attachment region 104 disposed on the first face surface 72, which region 104 is attached to the interior surface 60 of the nosecone body wall 52 (e.g., attachment by an adhesive 106 as shown in FIG. 12, or by other attachment means). The attachment region 104 includes a first attachment region portion 108 and a second attachment region portion 110. The first attachment region portion 108 and the second attachment region portion 110 are configured to define an interior unattached region 112 disposed between at least a length of the first attachment region portion 108 and at least a length of the second attachment region portion 110; e.g., the first attachment region portion 108 and the second attachment region portion 110 are collectively "V" or "U" or "crescent" shaped (as described below), with the interior unattached region 112 disposed within the "V" or the "U" or the "crescent".

The first attachment region portion 108 extends a distance along the first lateral edge 82 from the second end 80 towards the first end 78, but less than the entire distance along the first lateral edge 82 between the second end 80 and the first end 78, and a distance inwardly from the first lateral edge 82. The second attachment region portion 110 extends a distance along the second lateral edge 84 from the second end 80 towards the first end 78, but less than the entire distance along the second lateral edge 84 between the second end 80 and the first end 78, and a distance inwardly from the second lateral edge 84. The specific distances that the respective attachment region 108, 110 extends along the respective lateral edge 82, 84 and inwardly therefrom is chosen so that the access panel 44 is adequately attached to the nosecone body 42, and still allow the access panel 44 to deflect to permit access to a fastener tool 68 as will be described below. In some embodiments, the width of the first attachment region portion 108 or the second attachment region portion 110, or both, extending inwardly from the respective lateral edge 82, 84 may be tapered; e.g., decreasing in width. In those embodiments where both the first attachment region portion 108 and the second attachment region portion 110 taper in width, the attachment region 104 shape may be described as a "crescent" shape (e.g., see FIG. 9).

Figure 11:
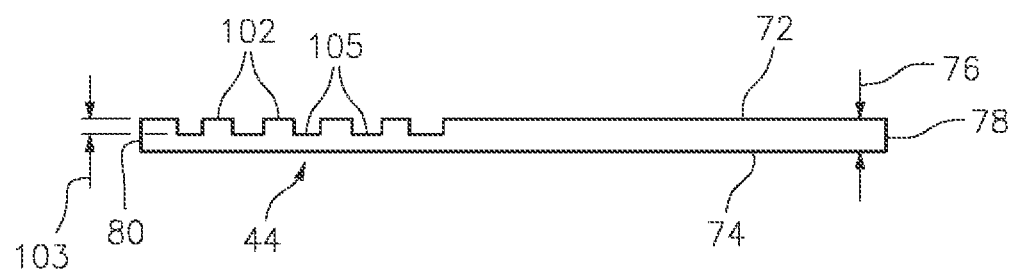
FIG. 11 is a diagrammatic side view of an access panel embodiment.

Referring to FIG. 11, in some embodiments the access panel 44 may include a plurality of spacer protrusions 102 (or alternatively described as depressions 105) disposed in an attachment region 104 of the first face surface 72 of the access panel 44. The spacer protrusions 102 may be disposed with the first face surface 72 face of the access panel 44 a distance 103 that is substantially equal to a film thickness of an adhesive used to attach the access panel 44 to the interior surface 60 of the nosecone body wall 52.

Referring to FIG. 12, in some embodiments the access panel 44 may have a stepped first face surface 72 wherein the thickness of the access panel 44 in the attachment region (e.g., "T1") is less than the thickness of the access panel 44 ("T2") outside of the attachment region 104. The difference in thickness may be chosen to account for the thickness ("T3") of the adhesive 106 attaching the access panel 44 to the interior surface 60. In some embodiments, the access panel 44 thickness in the attachment region 106 plus the thickness of the adhesive 106 are substantially equal to the thickness of the access panel 44 outside of the attachment region; e.g., T1+T3≈T2.

As described above, an attached access panel 44 is attached to the interior surface 60 of the nosecone body wall 52 (e.g., by an adhesive 106, fastener, bonding agent, etc.), and positioned such that a window 66 disposed within the nosecone body 42 is aligned with at least a portion of the interior unattached region 112 disposed at least partially between the first attachment region portion 108 and the second attachment region portion 110; e.g., aligned with the interior of the "V" or "U" or "crescent" shaped attachment region (where the access panel 44 is not attached to the nosecone body 42). In its normal state, therefore, the access panel 44 is contiguous with the curved interior surface 60 of the nosecone body 42. The curvature of the access panel 44 in this normal state causes the elastomeric material access panel 44 to be biased against the interior surface 60 of the nosecone body 42.

Referring to FIG. 4, in instances when an operator wishes to access a fastener 70 fixing the nosecone body 42 to an attachment structure 46, or to install such a fastener 70, the operator can insert a fastener tool 68 (e.g., a socket, allen wrench tool, torx tool, etc.) through the respective window 66 in a direction toward the fastener 70 to be accessed. Typically, the fastener tool 68 is inserted through the window 66 in a direction that extends substantially parallel to the axially extending centerline 58 of the nosecone body 42. As the tool 68 is inserted, the elastomeric access panel 44 will deflect at least partially radially, and at least a portion of the access panel 44 adjacent the first end 78 of the access panel 44 will elastically deflect away from the interior surface 60 of the nosecone body 42, thereby providing access to the fastener 70. The attached portion of the access panel 44 (i.e., the attachment region 104 adhered to the interior surface 60 of the nosecone body 42; i.e., the "V" or "U" or "crescent" shaped attachment region at least partially surrounding the aligned window 66) maintains engagement of the access panel 44 with the interior surface 60. Once the access to the fastener 70 is no longer needed, and the fastener tool 68 is removed, the elastomeric access panel 44 elastically returns to its normal state where it is biased against the interior surface 60 of the nosecone body 42.

Figure 13:
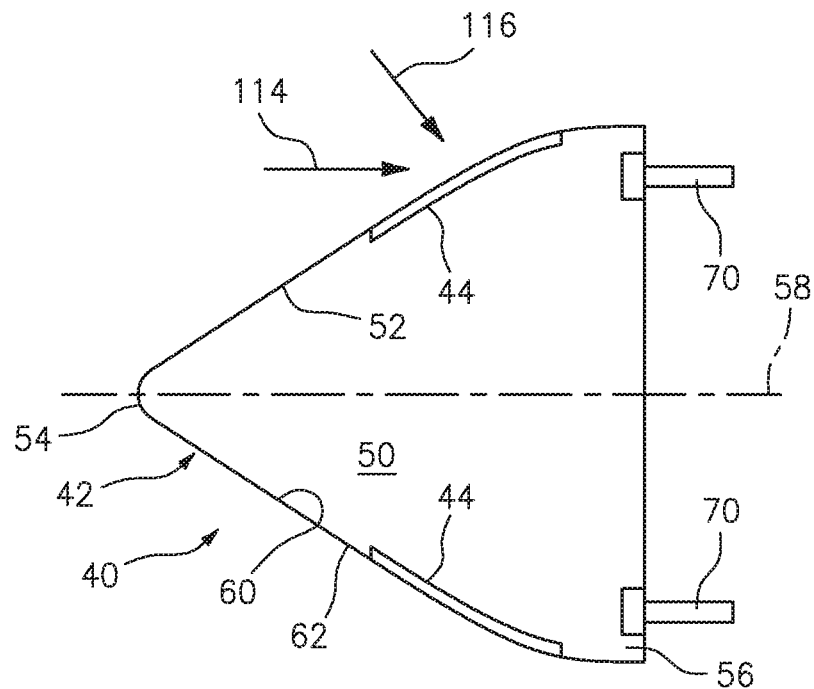
FIG. 13 is a diagrammatic side view of a nosecone assembly embodiment.
Figure 14:
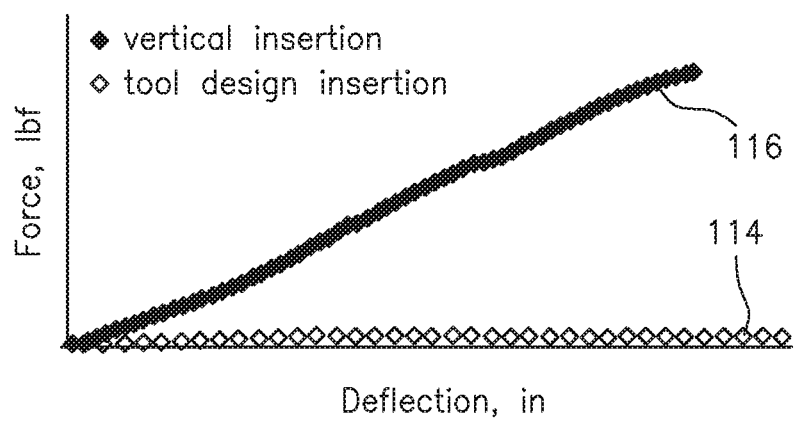
FIG. 14 is a graph illustrating tool insertion force (Y-axis) versus tool insertion extension (X-axis).

Referring to FIGS. 13 and 14, a benefit of the above described access panel 44 is that it provides "feedback" to the operator in regards to the positioning of the respective fastener 70 which is in a blind location prior to deflection of the elastomeric access panel 44. Specifically, the configuration of the present disclosure access panel 44 is such that the amount of force required to insert a fastener tool 68 is much less when the tool is being inserted in a direction 114 substantially toward the fastener 70, as opposed to a direction 116 that is normal to the wall 52 of the nosecone body 42 or perpendicular to the axially extending centerline 58. In other words, the fastener tool 68 insertion is subjected to much less resistance force when inserted in the appropriate direction as opposed to the resistance force encountered when the tool is inserted in some other direction. Hence, the ease with which the fastener tool 68 may be inserted provides "feedback" to the operator trying to find the blind fastener 70. This aspect greatly facilitates any installation or removal of the nosecone assembly 40. The operator "feedback" that occurs when the tool is inserted correctly (e.g., lower force acting on the tool) is a result at least partially of access panel 44 curvature changing (e.g., "flipping") from convex (i.e., the curvature that mates with the wall 52 of the nosecone body 42) to concave. As panel 44 deflects away from the wall 52 during insertion, the middle portion of the panel 44 deflects while the outer regions (e.g., the first attachment region portion 108 and the second attachment region portion 110 and potentially other portions of the panel 44 proximate thereto) maintain contact with the wall 52 of the nosecone 42. In this manner, the amount of stress placed on the attachment region portions 108, 100, is decreased or potentially eliminated. Hence, the present disclosure limits stress on the attachment means (e.g., adhesive) within the attachment regions portions 108, 110, which enhances the durability of the access panel/nosecone. FIG. 14 is a graph illustrating tool insertion force (Y-axis) versus tool insertion extension (X-axis) for a vertical tool insertion (e.g., normal to the nosecone wall 52 as shown in FIG. 13 as direction 116) and for a tool design insertion (e.g., substantially parallel to the centerline 58 as shown in FIG. 13 as direction 114).

Although the present invention has been described with reference to particular embodiments, workers skilled in the art will recognize that changes may be made in form and detail without departing from the spirit and scope of the invention.

What is claimed is:

1. A nosecone assembly having an axially extending centerline, the assembly comprising:
   a nosecone body having at least one wall extending between a forward end and an aft end, the at least one wall at least in part defines an interior cavity of the nosecone body, the at least one wall having an interior surface contiguous with the interior cavity, and at least one window aperture extending through the at least one wall; and
   at least one access panel having a first face surface and an opposite second face surface, a first end, a second end, a first lateral edge, and a second lateral edge, wherein the first lateral edge extends between the first end and the second end, and the second lateral edge extends between the first end and the second end;
   wherein the at least one access panel is attached to the wall interior surface within an attachment region that includes a first attachment region portion partially contiguous with a second attachment region portion, the first attachment region portion and the second attachment region portion collectively define an interior unattached region disposed between at least a length of the first attachment region portion and at least a length of the second attachment region portion, and wherein the interior unattached region is aligned with the at least one window aperture; and
   wherein the first lateral edge extends a first distance between the first end and the second end, and the first attachment region portion extends a second distance along the first lateral edge from the second end towards the first end, where the second distance is less than the first distance.

2. The nosecone assembly of claim 1, wherein the second lateral edge extends a third distance between the first end and the second end, and the second attachment region portion extends a fourth distance along the second lateral edge from the second end towards the first end, where the fourth distance is less than the third distance.

3. The nosecone assembly of claim 2, wherein the attachment region is "U" shaped, with the interior unattached region disposed within the "U" shape.

4. The nosecone assembly of claim 2, wherein the attachment region is "V" shaped, with the interior unattached region disposed within the "V" shape.

5. The nosecone assembly of claim 1, wherein the at least one access panel comprises an elastomeric material.

6. The nosecone assembly of claim 5, wherein the at least one access panel is disposable in a normal state wherein at least a portion of the at least one access panel is biased against the wall interior surface, and is configured to elastically return to the normal state.

7. The nosecone assembly of claim 1, wherein the first lateral edge and the second lateral edge converge toward one another in a direction from the first end towards the second end.

8. The nosecone assembly of claim 7, wherein the first lateral edge and the second lateral edge collectively form a "V" shape in proximity to the second end.

9. The nosecone assembly of claim 1, wherein the first end extends a first end distance between the first lateral edge and the second lateral edge, and the second end extends a second end distance between the first lateral edge and the second lateral edge, and the first end distance is greater than the second end distance.

10. The nosecone assembly of claim 1 wherein the at least one access panel includes a protrusion shaped to mate with the at least one window aperture.

11. The nosecone assembly of claim 1, wherein the at least one access panel includes a protective substrate attached to the first face surface, and positioned to align with the at least one window aperture.

12. A nosecone assembly having an axially extending centerline, the assembly comprising:
   a nosecone body having at least one wall extending between a forward end and an aft end, the at least one wall at least in part defines an interior cavity of the nosecone body, the at least one wall having an interior surface contiguous with the interior cavity, and at least one window aperture extending through the at least one wall; and
   at least one access panel having a first face surface and an opposite second face surface, a first end, a second end, a first lateral edge, and a second lateral edge, wherein the first lateral edge extends between the first end and the second end, and the second lateral edge extends between the first end and the second end;
   wherein the at least one access panel is attached to the wall interior surface within an attachment region that includes a first attachment region portion partially contiguous with a second attachment region portion, the first attachment region portion and the second attachment region portion collectively define an interior unattached region, and wherein the interior unattached region is aligned with the at least one window aperture; and wherein the first lateral edge extends a first distance between the first end and the second end, and the first attachment region portion extends a second distance along the first lateral edge from the second end towards the first end, where the second distance is less than the first distance.

13. The nosecone assembly of claim 12, wherein the at least one access panel comprises an elastomeric material.

14. A gas turbine engine, comprising:
a fan section;
a nosecone assembly connected to the fan section, the nosecone assembly having an axially extending centerline, the assembly comprising:
a nosecone body having at least one wall extending between a forward end and an aft end, the at least one wall at least in part defines an interior cavity of the nosecone body, the at least one wall having an interior surface contiguous with the interior cavity, and at least one window aperture extending through the at least one wall; and
at least one access panel having a first face surface and an opposite second face surface, a first end, a second end, a first lateral edge, and a second lateral edge, wherein the first lateral edge extends between the first end and the second end, and the second lateral edge extends between the first end and the second end;
wherein the at least one access panel is attached to the wall interior surface within an attachment region that includes a first attachment region portion partially contiguous with a second attachment region portion, the first attachment region portion and the second attachment region portion collectively define an interior unattached region disposed between at least a length of the first attachment region portion and at least a length of the second attachment region portion, and wherein the interior unattached region is aligned with the at least one window aperture; and
wherein the first lateral edge extends a first distance between the first end and the second end, and the first attachment region portion extends a second distance along the first lateral edge from the second end towards the first end, where the second distance is less than the first distance.

15. The gas turbine engine of claim 14, wherein the second lateral edge extends a third distance between the first end and the second end, and the second attachment region portion extends a fourth distance along the second lateral edge from the second end towards the first end, where the fourth distance is less than the third distance.

16. The gas turbine engine of claim 14, wherein the at least one access panel comprises an elastomeric material.

17. The gas turbine engine of claim 16, wherein the at least one access panel is disposable in a normal state wherein at least a portion of the at least one access panel is biased against the wall interior surface, and is configured to elastically return to the normal state.

18. The gas turbine engine of claim 14, wherein the attachment region is "U" shaped, "V" shaped, or "crescent" shaped, with the interior unattached region respectively disposed within the "U" shape, "V" shape, or "crescent" shape.

* * * * *